United States Patent
Matsui et al.

(10) Patent No.: US 6,787,256 B2
(45) Date of Patent: Sep. 7, 2004

(54) HUMIDIFICATION APPARATUS FOR FUEL CELLS

(75) Inventors: Nobuki Matsui, Osaka (JP); Shuji Ikegami, Osaka (JP); Yasunori Okamoto, Osaka (JP); Kazuo Yonemoto, Osaka (JP)

(73) Assignee: Daikin Industries Ltd, Osaka (JP)

( * ) Notice: Subject to any disclaimer, the term of this patent is extended or adjusted under 35 U.S.C. 154(b) by 584 days.

(21) Appl. No.: 09/914,379

(22) PCT Filed: Dec. 14, 2000

(86) PCT No.: PCT/JP00/08881

§ 371 (c)(1), (2), (4) Date: Aug. 28, 2001

(87) PCT Pub. No.: WO01/48849

PCT Pub. Date: Jul. 5, 2001

(65) Prior Publication Data

US 2002/0160240 A1 Oct. 31, 2002

(30) Foreign Application Priority Data

Dec. 28, 1999 (JP) .......................... 11-372695

(51) Int. Cl.[7] ............................ H01M 8/04
(52) U.S. Cl. ............... 429/13; 429/22; 429/24; 429/26; 429/30
(58) Field of Search ............... 429/13, 22, 26, 429/30, 34, 39

(56) References Cited

U.S. PATENT DOCUMENTS 6,696,186 B1 * 2/2004 Herdeg et al. ............. 429/13

FOREIGN PATENT DOCUMENTS

| JP | 2-293551 | 12/1990 | |
|----|----------|---------|---|
| JP | 3-269958 | 12/1991 | |
| JP | 5-54900  | 3/1993  | |
| JP | 6-132038 | 5/1994  | |
| JP | 6-260190 | 9/1994  | |
| JP | 7-155574 | 6/1995  | |
| JP | 10-172593 | 6/1998 | |
| JP | 10-33010 | 12/1998 | |
| JP | 2000306594 | * 2/2000 | ............ H01M/8/04 |

* cited by examiner

Primary Examiner—Bruce F. Bell
Assistant Examiner—Monique Wills
(74) Attorney, Agent, or Firm—Nixon Peabody LLP; Donald R. Studebaker (57) ABSTRACT

When humidifying, almost to water vapor saturation, reformed gas that is supplied to a hydrogen electrode of a solid polymer type fuel cell (1) and air that is supplied to an oxygen electrode of the fuel cell (1), heating for obtaining water vapor to establish such saturation is not required. For the purpose of improving the thermal efficiency of a fuel cell system, water vapor contained in hydrogen electrode exhaust gas exhausted from the hydrogen electrode of the fuel cell (1) is let to penetrate through a water vapor permeable membrane (34), whereas water vapor contained either in air that is introduced into a partial oxidation reformation section (6) or in oxygen electrode exhaust gas exhausted from the oxygen electrode is let to penetrate through the water vapor permeable membrane (34) so that the water vapor is supplied to air that is supplied to the oxygen electrode of the fuel cell (1).

20 Claims, 9 Drawing Sheets

HUMIDIFICATION APPARATUS FOR FUEL CELLS

TECHNICAL FIELD

The present invention relates to a fuel cell humidification apparatus for the humidification of gases which are supplied to electrodes of a fuel cell of the solid polymer type.

BACKGROUND ART

Generally, hydrogen can be generated by reforming hydrocarbon or methanol. Hydrogen thus generated is applicable to fuel cells.

Such a type of fuel cell includes one known in the art as the solid polymer type (see for example Japanese Unexamined Patent Gazette No. H11-67256). This solid polymer type fuel cell comprises a hydrogen electrode (as a fuel electrode) and an oxygen electrode (as an air electrode) between which is interposed a solid polymer electrolyte, wherein hydrogen containing reformed gas as the fuel and oxygen containing air (which is oxygen containing gas) are supplied to the hydrogen electrode and to the oxygen electrode, respectively, to create electromotive force between the electrodes.

In such a solid polymer type fuel cell, it is required that the electrolyte be kept moist by water for reducing proton conduction resistance in the electrolyte, and hydrogen containing reformed gas and oxygen containing gas are supplied, almost in a state of water vapor saturation.

In order to place reformed gas and air in such a state, for the case of the reformed gas, water vapor is introduced during its generation so that it holds moisture. The amount of heat necessary for obtaining water vapor that is added to the reformed gas during generation thereof is afforded by reformed gas sensible heat or by combustion heat resulting from combustion of fuel cell exhaust gas by burner.

On the other hand, for the case of the air that is supplied to the oxygen electrode of the fuel cell, fuel cell cooling water is used to humidify the air within the fuel cell and the amount of heat necessary for such humidification is afforded by fuel cell exhaust heat.

However, since the amount of heat necessary for obtaining water vapor that is added to reformed gas and air is afforded by reformed gas sensible heat, fuel cell exhaust gas combustion heat, or fuel cell exhaust heat, this essentially requires a supply of heat, and improvements are desirable to increase the thermal efficiency of fuel cell systems.

Bearing in mind the above, the present invention was made. Accordingly, an object of the present invention is to improve the thermal efficiency of a fuel cell system by making good utilization of fuel cell exhaust gas for humidifying gases such as reformed gas to the fuel cell without having to provide heating necessary for obtaining water vapor.

DISCLOSURE OF THE INVENTION

Attention was directed to the fact that fuel cell exhaust gases contain therein water vapor and, more specifically, in accordance with the present invention, water vapor contained in the fuel cell exhaust gas penetrates through a water vapor permeable membrane and then supplied to gas such as reformed gas in order to achieve the foregoing object.

More specifically, a humidification means (31) is provided to a fuel cell (1) having oxygen and hydrogen electrodes between which is interposed a solid polymer electrolyte for producing an electromotive force between the electrodes by supplying hydrogen containing reformed gas reformed in a reformation means (4) and oxygen containing gas to the hydrogen electrode and to the oxygen electrode, respectively, whereby water vapor contained in exhaust gas expelled from the fuel cell (1) penetrates through a water vapor permeable membrane (34) so that the water vapor is supplied, at least, to supply gas to the reformation means (4).

In accordance with such an arrangement, by virtue of the humidification means (31), water vapor contained in exhaust gas drawn out of the fuel cell (1) passes through the water vapor permeable membrane (34) so that it is supplied, at least, to gas to the reformation means (4). This humidifies, almost to water vapor saturation, reformed gas that is supplied to the hydrogen electrode of the fuel cell (1), and a supply of heat for such humidification is made unnecessary. Consequently, it is possible to improve the thermal efficiency of a fuel cell system.

Further, the reformation means (4) may include a partial oxidation reformation section (6) which generates, from source gas, hydrogen rich reformed gas through reactions including partial oxidation.

Further, the humidification means (31) may be arranged so that water vapor contained in hydrogen electrode exhaust gas expelled from the hydrogen electrode of said fuel cell (1) penetrates through the water vapor permeable membrane (34) and then supplied either to air or to a mixture of air and source gas that is introduced into the partial oxidation reformation section (6).

As a result of such arrangement, reformed gas that is supplied to the hydrogen electrode of the fuel cell (1) is humidified by the passage of water vapor contained in hydrogen electrode exhaust gas of the fuel cell (1) through the water vapor permeable membrane (34), thereby improving the thermal efficiency of a fuel cell system.

On the other hand, the reformation means (4) may include a water vapor reformation section (43) which generates, from source gas, hydrogen rich reformed gas through reactions.

Further, the humidification means (31) may be arranged so that water vapor contained in hydrogen electrode exhaust gas expelled from the hydrogen electrode of said fuel cell (1) penetrates through the water vapor permeable membrane (34) and then supplied to source gas that is introduced into the water vapor reformation section (43).

As a result of such arrangement, reformed gas that is supplied to the hydrogen electrode of the fuel cell (1) can be humidified by the passage of water vapor contained in hydrogen electrode exhaust gas of the fuel cell (1) through the water vapor permeable membrane (34), thereby improving the thermal efficiency of a fuel cell system.

The humidification means (31) may include a first humidification section (32) which humidifies air or gas with water vapor in hydrogen electrode exhaust gas and a second humidification section (36) which humidifies the air or gas humidified in the first humidification section (32) with water vapor resulting from permeation of heated hot water through a water vapor permeable membrane (38).

As a result of such arrangement, air or gas is humidified by the passage of water vapor in hydrogen electrode exhaust gas through the water vapor permeable membrane (34) in the first humidification section (32). The air or gas is further subjected to humidification by water vapor resulting from permeation of heated hot water penetrating through the water vapor permeable membrane (38) in the second humidification section (36). Such two-stage air (or gas) humidification provides stable humidification of the reformed gas even when the fuel cell (1) undergoes a change in its load.

The humidification means (31) may be arranged so that water vapor contained in oxygen electrode exhaust gas expelled from the oxygen electrode of the fuel cell (1) penetrates through the water vapor permeable membrane (34) and then supplied to oxygen containing gas to the fuel cell (1).

As a result of such arrangement, oxygen containing gas that is supplied to the oxygen electrode of the fuel cell (1) is humidified by the passage of water vapor in oxygen electrode exhaust gas of the fuel cell (1) through the water vapor permeable membrane (34). Also, in this case it is possible to improve the thermal efficiency of a fuel cell system.

In such a case, the humidification means (31) may include a first humidification section (33) which humidifies gas with water vapor in oxygen electrode exhaust gas and a second humidification section (37) which humidifies the gas humidified in the first humidification section (33) with water vapor resulting from permeation of heated hot water through the water vapor permeable membrane (38).

As a result of such arrangement, oxygen containing gas is humidified by the passage of water vapor in oxygen electrode exhaust gas through the water vapor permeable membrane (34) in the first humidification section (33). Thereafter, the oxygen containing gas is further humidified by water vapor resulting from permeation of heated hot water through the water vapor permeable membrane (38) in the second humidification section (37). Because of such two-stage oxygen containing gas humidification, it is possible to achieves stable oxygen containing gas humidification even when the fuel cell (1) undergoes a change in its load.

The humidification means (31) may be arranged so that water vapor contained in oxygen electrode exhaust gas expelled from the oxygen electrode of the fuel cell (1) penetrates through the water vapor permeable membrane (34) and then supplied either to air or to a mixture of air and source gas that is introduced into the partial oxidation reformation section (6).

As a result of such arrangement, reformed gas that is supplied to the hydrogen electrode of the fuel cell (1) is humidified by the passage of water vapor contained in oxygen electrode exhaust gas of the fuel cell (1) through the water vapor permeable membrane (34), thereby improving the thermal efficiency of a fuel cell system.

The humidification means (31) is arranged so that water vapor contained in oxygen electrode exhaust gas expelled from the oxygen electrode of said fuel cell (1) penetrates through the water vapor permeable membrane (34) and then supplied to source gas that is introduced into the water vapor reformation section (43).

Also, as a result of such arrangement, reformed gas that is supplied to the hydrogen electrode of the fuel cell (1) is humidified by the passage of water vapor contained in oxygen electrode exhaust gas of the fuel cell (1) through the water vapor permeable membrane (34), thereby improving the thermal efficiency of a fuel cell system.

In such a case, the humidification means (31) includes a first humidification section (33) which humidifies air or gas with water vapor in oxygen electrode exhaust gas and a second humidification section (37) which humidifies the air or gas humidified in the first humidification section (33) with water vapor resulting from permeation of heated hot water through the water vapor permeable membrane (38).

As a result of such arrangement, air or gas is humidified in the first humidification section (33) by the passage of water vapor in oxygen electrode exhaust gas through the water vapor permeable membrane (34) and thereafter further humidified in the second humidification section (37) by water vapor resulting from permeation of heated hot water penetrating through the water vapor permeable membrane (38). Such a two-stage air (or gas) humidification makes it possible to achieves stable reformed gas humidification even when the fuel cell (1) undergoes a change in its load.

Further, the humidification means (31) is arranged so that water vapor contained in hydrogen electrode exhaust gas expelled from the hydrogen electrode of the fuel cell (1) penetrates through the water vapor permeable membrane (34) and then supplied to oxygen containing gas to the fuel cell (1).

As a result of such arrangement, oxygen containing gas that is supplied to the oxygen electrode of the fuel cell (1) is humidified by water vapor in hydrogen electrode exhaust gas of the fuel cell (1), thereby improving the thermal efficiency of a fuel cell system.

In such a case, the humidification means (31) includes a first humidification section (32) which humidifies gas with water vapor in hydrogen electrode exhaust gas and a second humidification section (36) which humidifies the gas humidified in the first humidification section (32) with water vapor resulting from permeation of heated hot water through the water vapor permeable membrane (38).

As a result of such arrangement, oxygen containing gas is humidified in the first humidification section (32) by the passage of water vapor in hydrogen electrode exhaust gas through the water vapor permeable membrane (34) and thereafter further humidified in the second humidification section (36) by water vapor resulting from permeation of heated hot water. Such two-stage oxygen containing gas humidification makes it possible to achieve stable oxygen containing gas humidification even when the fuel cell (1) undergoes a change in its load.

The humidification means (31) may be formed integrally with said fuel cell (1). As a result of such arrangement, the humidification section (31) is incorporated into the fuel cell (1), thereby making it possible to provide a simplified, compact structure for fuel cell systems.

An arrangement may be made in which the first and second humidification sections (32), (33), (36) and (37) of the humidification means (31) are formed integrally with the fuel cell (1) and the heated hot water is cooling water for said fuel cell (1).

As a result of such arrangement, it becomes possible to utilizes existing cooling water as the heated hot water as well as to provide a simplified, compact structure for fuel cell systems while achieving stable humidification of the gas to the fuel cell (1).

Alternatively, an arrangement may be made in which the first and second humidification sections (32), (33), (36) and (37) of the humidification means (31) are provided separately from the fuel cell (1) and the heated hot water is hot water for a hot water supply means (16). As a result of such arrangement, the heated hot water can be embodied.

The water vapor permeable membrane (34), through which water vapor contained in exhaust gas penetrates, is a hydrophilic membrane. Alternatively, the water vapor permeable membrane (34), through which water vapor contained in exhaust gas penetrates, is a polymer membrane having a sulfonic acid group.

Such arrangement provides the water vapor permeable membrane (34) suitable for allowing the passage of water vapor contained in exhaust gas of the fuel cell (1).

The water vapor permeable membrane (38) of each of the second humidification sections (36) and (37) is a hydrophobic porous membrane. Further, the water vapor permeable membrane (38) of each of the humidification sections (36) and (37) is a porous membrane formed from a porous membrane of the polytetrafluoropolyethylene family, the polypropylene family or the polyethylene family.

Such arrangement provides the water vapor permeable membrane (38) suitable for allowing the passage of water vapor from heated hot water.

BEST MODE FOR CARRYING OUT THE INVENTION

Best modes for carrying out the present invention will be described as examples of the embodiment thereof by making reference to the accompanying drawings.

First Embodiment

Figure 1:
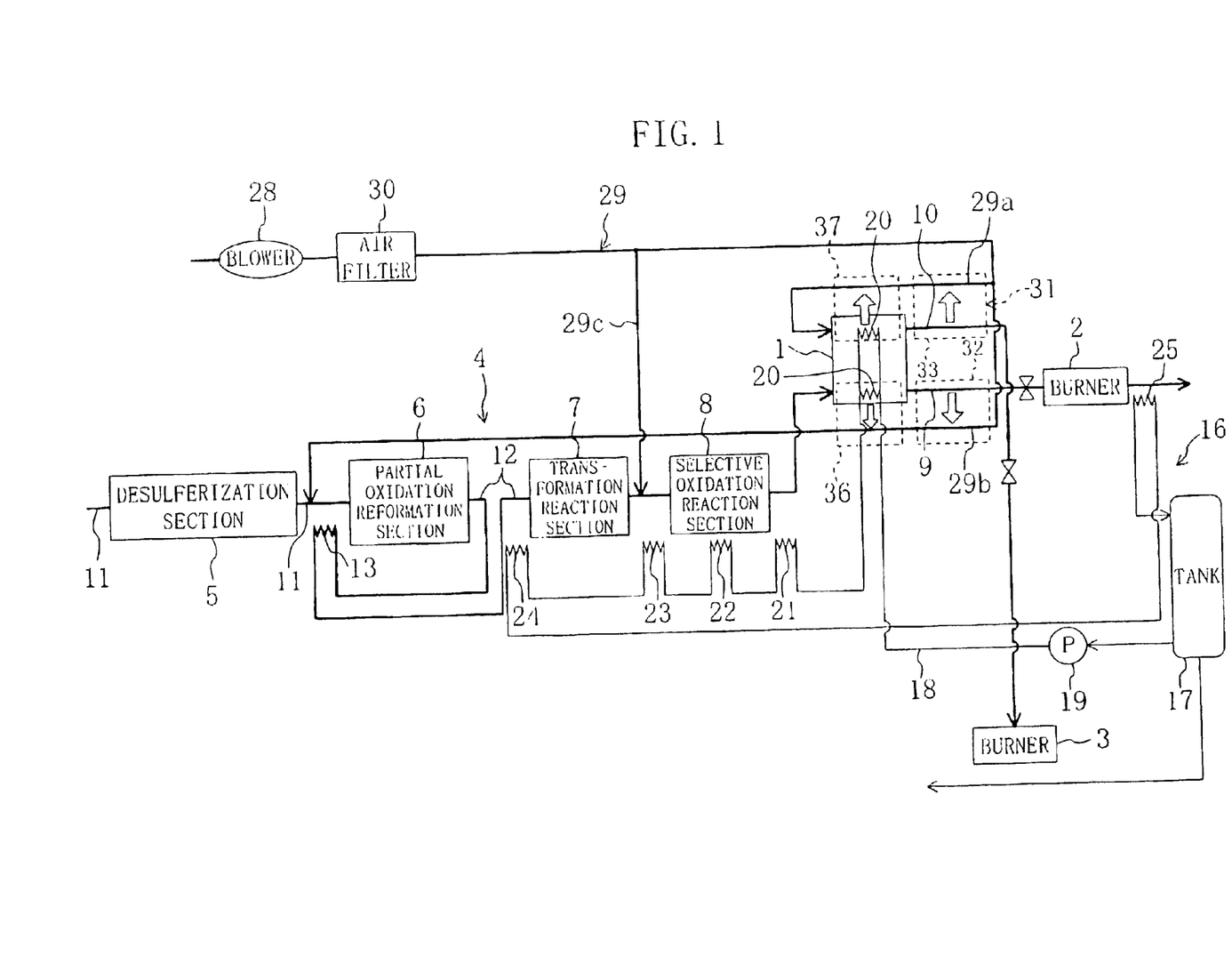
FIG. 1 is a circuit diagram showing a fuel cell system arrangement relating to a first embodiment of the present invention.

Referring to FIG. 1, there is shown an entire arrangement of a fuel cell system relating to a first embodiment of the present invention. The reference numeral (1) represents a typical fuel cell of the solid polymer type known in the art. Although not illustrated in the figure, the fuel cell (1) comprises a hydrogen electrode (fuel electrode) as an anode which is a catalyst electrode and an oxygen electrode (air electrode) as a cathode, wherein a solid polymer electrolyte is sandwiched between these electrodes. In the fuel cell (1), the hydrogen electrode is fed hydrogen containing reformed gas reformed by a reformation device (4) (reformation means) which is describe later, whereas the oxygen electrode is fed oxygen containing air (oxygen containing gas). Electrode reactions occur and electromotive force is produced between the electrodes.

The reference numeral (2) represents a hydrogen electrode exhaust gas burner by which hydrogen electrode exhaust gas expelled from the hydrogen electrode of the fuel cell (1) is burned. The reference numeral (3) represents an oxygen electrode exhaust gas burner by which oxygen electrode exhaust gas expelled from the oxygen electrode of the fuel cell (1) is burned. The reference numeral (4) represents a reformation device which reforms source gas containing city gas and humidified air so as to generate hydrogen rich reformed gas and supplies it to the hydrogen electrode of the fuel cell (1).

The reformation device (4) comprises a desulfurization section (5), a partial oxidation reformation section (6), a transformation reaction section (7), and a CO selective oxidation reaction section (8), and the desulferization section (5) and the partial oxidation reformation section (6) are connected together by a source gas passageway (11). Further, the partial oxidation reformation section (6), the transformation reaction section (7), and the CO selective oxidation reaction section (8) are connected together by a reformed gas passageway (12).

The desulferization section (5) removes sulfur components from source gas (which contains city gas and humidified air) supplied to the reformation device (4). Further, the partial oxidation reformation section (6) introduces source gas supplied from the desulfurization section (5) through the source gas passageway (11) and generates, from the source gas introduced, hydrogen rich reformed gas by reactions including partial oxidation.

Further, the transformation reaction section (7) reduces the CO concentration of reformed gas generated in the partial oxidation reformation section (6) by a water gas shift reaction. Positioned in the reformed gas passageway (12) between the partial oxidation reaction section (6) and the transformation reaction section (7) is a source gas preheating section (13) by which reformed gas generated in the partial oxidation reaction section (6) is cooled for CO transformation in the transformation reaction section (7) to recover exhaust heat, and the exhaust heat thus recovered is used to preheat source gas in the source gas passageway (11) that is supplied to the partial oxidation reformation section (6).

Furthermore, the CO selective oxidation reaction section (8) is connected to the transformation reaction section (7) though the reformed gas passageway (12). The CO selective oxidation reaction section (8) reduces the CO concentration of reformed gas transformed in the transformation reaction section (7). And the CO selective oxidation reaction section (8) is connected to the hydrogen electrode of the fuel cell (1).

The reference numeral (16) represents a cooling water supply device as a hot water supply means. The cooling water supply device (16) is provided with a water tank (17) for storing hot water. The water tank (17) is connected, at its supply portion, to the upstream end of a cooling water passageway (18). The downstream end of the cooling water passageway (18) is connected to a recovery portion of the water tank (17). Moreover, disposed in the cooling water passageway (18) is a circulation pump (19) by which water is circulated between the water tank (17) and the cooling water passageway (18).

Connected in series from the upstream side in the following order and arranged in the cooling water passageway (18) on the circular pump's (19) downstream side are a pair of fuel cell cooling sections (20) and (20) for cooling the fuel cell (1) with water discharged from the circular pump (19) and recovering exhaust heat, a first heat exchange section (21) for cooling reformed gas generated in the CO selective oxidation reaction section (8) and recovering exhaust heat, a second heat exchange section (22) for recovering reaction heat produced in the CO selective oxidation reaction section (8), a third heat exchange section (23) for cooling reformed gas generated in the transformation reaction section (7) and recovering exhaust heat, a fourth heat exchange section (24) for cooling reformed gas generated in the partial oxidation reformation section (6) for CO transformation in the transformation reaction section (7) and recovering exhaust heat, and a burner heat recover section (25) for cooling combusted gas expelled from the hydrogen electrode exhaust gas burner (2) and recovering exhaust heat. Further, the pair of fuel cell cooling sections (20) and (20) are connected together in parallel.

The reference numeral (28) represents a blower for supplying air. Connected to the blower (28) is the upstream end of an air supply passageway (29). A filter (30) is disposed in the air supply passageway (29). The air supply passageway (29) branches off, at its downstream side portion, in parallel into first to third branch air passageways (29a), (29b) and (29c). The downstream side of the first branch air passageway (29a) is connected to the oxygen electrode of the fuel cell (1), and air (which is oxygen containing gas) from the blower (28) is supplied, through the first branch air passageway (29a) of the air supply passageway (29), to the oxygen electrode of the fuel cell (1).

Furthermore, the downstream end of the second branch air passageway (29b) of the air supply passageway (29) is connected to the source gas passageway (11) directly upstream of the partial oxidation reaction section (6), and a part of air supplied from the blower (28) is provided to source gas at the partial oxidation reaction section's (6) direct upstream side so that oxygen necessary for partial oxidation is mixed with the source gas by the air.

Further, the downstream end of the third branch air passageway (29c) of the air supply passageway (29) is connected to the reformed gas passageway (12) directly upstream of the CO selective oxidation reaction section (8), and a part of air supplied from the blower (28) is provided to reformed gas at the CO selective oxidation reaction section's (8) direct upstream side so that oxygen necessary for CO selective oxidation is mixed with the reformed gas by the air.

Figure 2:
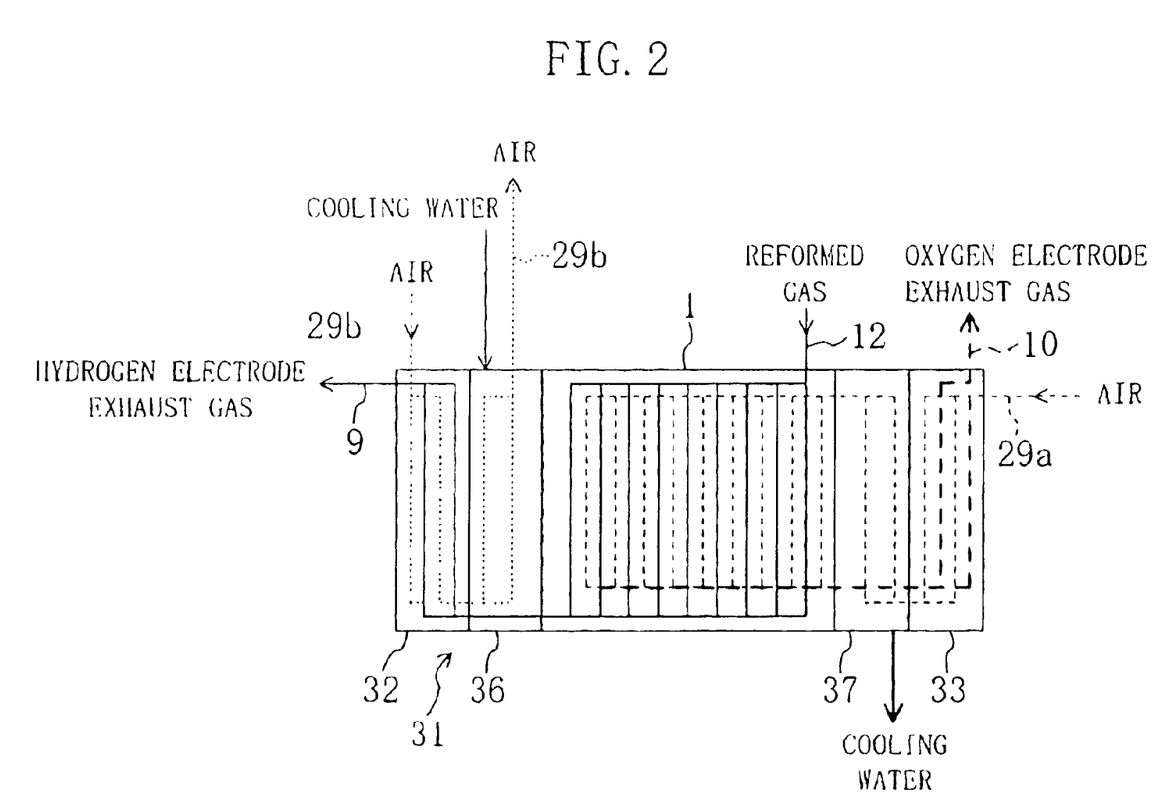
FIG. 2 is an explanatory diagram schematically showing a fuel cell arrangement and a humidification apparatus arrangement.

The present invention is characterized in that a humidification apparatus (31) is formed integrally with the fuel cell (1). The humidification apparatus (31) supplies water vapor to supply gas to the reformation device (4) as well as to air to the oxygen electrode of the fuel cell (1) for humidifying the supply gas and air. Also, as shown in FIG. 2, the humidification apparatus (31) basically comprises a first humidification section (32) on the hydrogen electrode exhaust gas side and a first humidification section (33) on the oxygen electrode exhaust gas side, whereby water vapor contained in exhaust gas drawn out of the fuel cell (1) penetrates through the water vapor permeable membrane (34) (see FIG. 3) so that the water vapor is supplied to supply gas to the reformation device (4) and to air to the oxygen electrode. The first humidification section (32) on the hydrogen electrode exhaust gas side causes water vapor, which is contained in hydrogen electrode exhaust gas expelled from the hydrogen electrode of the fuel cell (1) and held in the hydrogen electrode exhaust gas passageway (9) prior to reaching the hydrogen electrode exhaust gas burner (2), to penetrate through the water vapor permeable membrane (34), so that the water vapor is supplied to air in the second branch air passageway (29b) of the air supply passageway (29), i.e., air that is introduced into the partial oxidation reformation section (6).

On the other hand, the first humidification section (33) on the oxygen electrode exhaust gas side causes water vapor, which is contained in oxygen electrode exhaust gas expelled from the oxygen electrode of the fuel cell (1) and held in the oxygen electrode exhaust gas passageway (10) prior to reaching the oxygen electrode exhaust gas burner (3), to penetrate through the water vapor permeable membrane (34), so that the water vapor is supplied to air in the first branch air passageway (29a) of the air supply passageway (29), i.e., air that is introduced into the oxygen electrode of the fuel cell (1).

Figure 3:
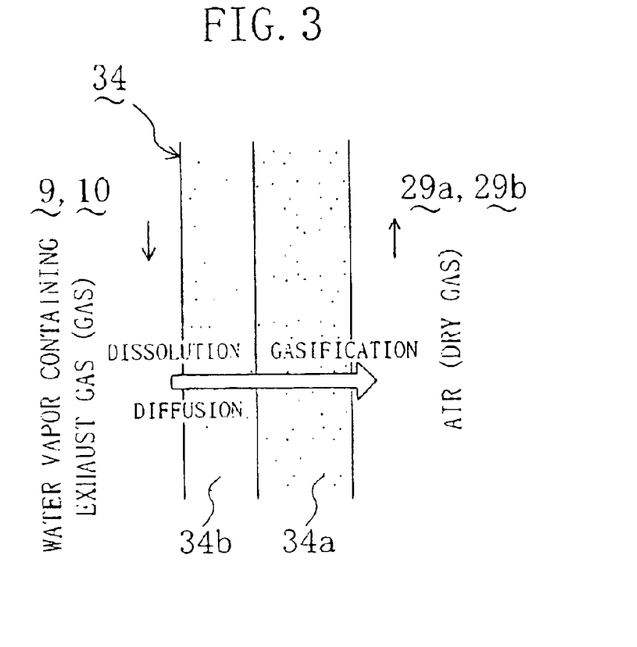
FIG. 3 is an enlarged cross-sectional diagram outlining a water vapor permeable membrane for a first humidification section.

As shown in FIG. 3, the water vapor permeable membrane (34), through which water vapor contained in exhaust gas penetrates in the first humidification sections (32) and (33), is a hydrophilic membrane such as a perfluorosulfonic acid polymer membrane, a polyvinyl alcohol membrane and an alginic acid membrane. The water vapor permeable membrane (34) is formed by integration of a support membrane (34a) arranged on the air side (dry gas side) and an active membrane (34b) arranged on the water vapor-containing exhaust gas side, wherein exhaust gas water vapor is diffused while being dissolved into the active membrane (34b), and the water vapor penetrates through the active membrane (34b) to the air.

Additionally, positioned in the humidification apparatus (31) are a second humidification section (36) on the hydrogen electrode exhaust gas side and a second humidification section (37) on the oxygen electrode exhaust gas side for humidifying air humidified in each of the first humidification sections (32) and (33) with water vapor resulting from permeation of heated hot water through a water vapor permeable membrane (38) (see FIG. 4) in each fuel cell cooling section (20). The second humidification section (36) on the hydrogen electrode exhaust gas side humidifies the air humidified in the first humidification section (32) on the hydrogen electrode exhaust gas side with water vapors of heated hot water penetrating through the water vapor permeable membrane (38) in one of the fuel cell cooling sections (20).

Figure 4:
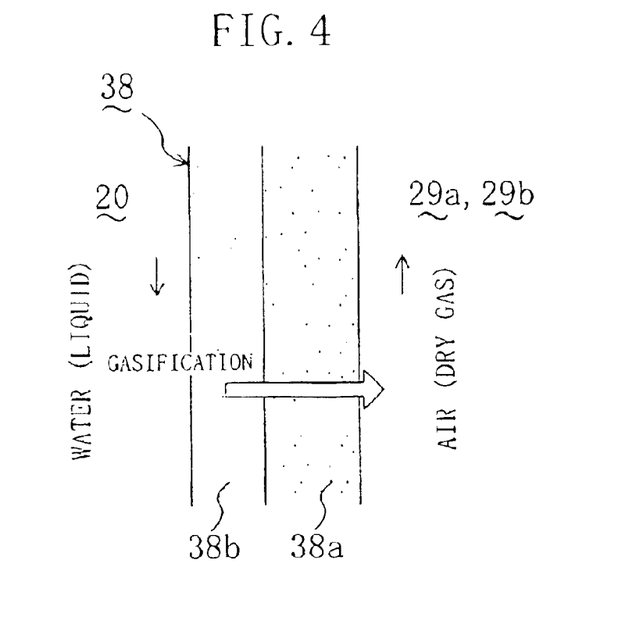
FIG. 4 is an enlarged cross-sectional diagram outlining a water vapor permeable membrane for a second humidification section.

On the other hand, the second humidification section (37) on the oxygen electrode exhaust gas side humidifies the air humidified in the first humidification section (33) on the oxygen electrode exhaust gas side with water vapor resulting from permeation of heated hot water through the water vapor permeable membrane (38) in the other fuel cell cooling section (20), like the second humidification section (36) on the hydrogen electrode exhaust gas side.

As shown in FIG. 4, the water vapor permeable membrane (38), through which water vapor from heated hot water penetrates in the second humidification sections (36) and (37), is a hydrophobic, porous membrane formed from a porous membrane of for example the polytetrafluoropolyethylene family, the polypropylene family, and the polyethylene family. The water vapor permeable membrane (38) is formed by integration of a support membrane (38a) arranged on the air side (dry gas side) and an active membrane (38b) which is arranged on the hot water side and which allows passage of gas (but not water), wherein hot water is evaporated into water vapor in fine pores of the active membrane (38b) and the water vapor penetrates therethrough and supplied to air. In FIG. 1, water vapors which penetrate through the permeable membranes (34) and (38) so that they are supplied to air are indicated by voided arrows.

As shown in FIG. 2, the first and second humidification sections (32) and (36) on the hydrogen electrode exhaust gas side are provided integrally to one side of the fuel cell (1), whereas the first and second humidification sections (33) and (37) are provided integrally to the other side of the fuel cell (1).

Accordingly, in the present embodiment, water in the water tank (17) is pressure delivered by the circulation pump (19) during the steady operation of the fuel cell system, and the water is heated by heat exchange with the fuel cell (1) in the fuel cell cooling sections (20) and (20) and thereafter supplied to the first to fourth heat exchange sections (21), (22), (23) and (24) of the reformation device (4), and then returned to the tank (17) by way of the burner heat recovery section (25).

Further, air supplied from the blower (28) is sent, through the first branch air passageway (29a) of the air supply passage (29), to the oxygen electrode of the fuel cell (1).

Furthermore, source gas enters the reformation device (4) where its sulfur components are removed by the desulfurization section (5). Thereafter, the source gas is mixed with the air supplied from the blower (28) via the second branch air passageway (29b). The air-mixed source gas is preheated in the source gas preheating section (13) and thereafter flows into the partial oxidation reformation section (6). In the partial oxidation reformation section (6), hydrogen rich reformed gas is generated from the source gas by reactions including partial oxidation and then delivered to the transformation reaction section (7) by way of the source gas preheating section (13), wherein the heat of the reformed gas delivered from the partial oxidation reformation section (6) to the transformation reaction section (7) is recovered by the source gas preheating section (13) and by the fourth heat exchange section (24) and water is heated by the heat recovered by the fourth heat exchange section (24).

Further, the CO concentration of the reformed gas supplied to the transformation reaction section (7) is reduced while it is passing through the transformation reaction section (7) by a water gas shift reaction and supplied to the CO selective oxidation reaction section (8), but it is mixed with air (oxygen) supplied by the third branch air passageway (29c) prior to being introduced into the CO selective oxidation reaction section (8). And, the heat of the reformed gas delivered from the transformation reaction section (7) to the CO selective oxidation reaction section (8) is recovered by the second heat exchange section (22) and water is heated by the heat recovered.

Furthermore, the CO concentration of the reformed gas supplied to the CO selective oxidation reaction section (8) is reduced to a further extent while it is passing through the CO selective oxidation reaction section (8) by a CO selective oxidation reaction and the reformed gas is supplied to the hydrogen electrode of the fuel cell (1). Reaction heat resulting from such a CO selective oxidation reaction in the CO selective oxidation reaction section (8) and the heat of the reformed gas delivered from the CO selective oxidation reaction section (8) to the fuel cell (1) are recovered by the second heat exchange section (22) and by the first heat exchange section (21), respectively. The heat thus recovered is used to heat water.

In the fuel cell (1), an electrode reaction occurs between the reformed gas supplied to the hydrogen electrode and the air supplied to the oxygen electrode, whereby electromotive force is produced between the electrodes. Thereafter, hydrogen electrode exhaust gas expelled from the hydrogen electrode of the fuel cell (1) is supplied to the hydrogen electrode exhaust gas burner (2) through the hydrogen electrode exhaust gas passageway (9) and burned there, whereas oxygen electrode exhaust gas expelled from the oxygen electrode is supplied to the oxygen electrode exhaust gas burner (3) through the oxygen electrode exhaust gas passageway (10) and burned there.

The hydrogen electrode exhaust gas expelled from the hydrogen electrode of the fuel cell (1) and the oxygen electrode exhaust gas expelled from the oxygen electrode each contain water vapors. The water vapor contained in the former electrode is supplied to air in the second branch air passageway (29b) of the air supply passageway (29) by the first humidification section (32) of the humidification apparatus (31), whereas the water vapor contained in the latter electrode is supplied to air in the first branch air passageway (29a) by the first humidification section (33). That is, the first humidification sections (32) and (33) are provided with the water vapor permeable membrane (34) which is formed of a hydrophilic membrane and the water vapors, contained in the hydrogen and oxygen electrode exhaust gases, penetrate through the water vapor permeable membrane (34), thereafter being supplied to air in the branch air passageway (29b) as well as to air in the branch air passageway (29a).

In the second humidification sections (36) and (37), water vapor from heated hot water is added to the air humidified by a supply of water vapor which has passed through the water vapor permeable membrane (34) in the first humidification sections (32) and (33), for providing further humidification. That is, the second humidification sections (36) and (37) are provided with the water vapor permeable membrane (38) which is a hydrophobic, porous membrane, and heated hot water in the fuel cell cooling section (20) is evaporated in the water vapor permeable membrane (38) while penetrating therethrough in the form of water vapor. The water vapor is additionally supplied to the air in each of the branch air passageways (29b) and (29a).

As described above, water vapor contained in hydrogen electrode exhaust gas from the hydrogen electrode of the fuel cell (1) penetrates through the water vapor permeable membrane (34) in the first humidification section (32) on the hydrogen exhaust gas side so that it is supplied to air in the second branch air passageway (29b). As a result, the water vapor is added, together with the air, to the partial oxidation reformation section (6). Accordingly, the reformed gas, which is introduced into the hydrogen electrode of the fuel cell (1) via the partial oxidation reformation section (6), the transformation reaction section (8) and the CO selective oxidation reaction section (8), is humidified almost to water vapor saturation. On the other hand, water vapor contained in oxygen electrode exhaust gas from the oxygen electrode of the fuel cell (1) is supplied to air to the oxygen electrode by the first humidification section (33) on the oxygen electrode exhaust gas side, whereby the air is humidified almost to water vapor saturation. This keeps the electrolyte of the fuel cell (1) moist, thereby making it possible to reduce the proton conduction resistance in the electrolyte.

At that time, water vapor that is supplied to air in the second branch air passage (29b) is one contained in hydrogen electrode exhaust gas from the hydrogen electrode of the fuel cell (1), and water vapor that is supplied to air to the oxygen electrode of the fuel cell (1) is one contained in oxygen electrode exhaust gas from the oxygen electrode of the fuel cell (1), therefore eliminating the need for heating water to obtain water vapor for humidifying reformed gas to the hydrogen electrode of the fuel cell (1) and air to the oxygen electrode. This improves the thermal efficiency of a fuel cell system.

Further, the air, humidified by water vapor contained in the hydrogen electrode exhaust gas in the first humidification section (32) on the hydrogen electrode exhaust gas side, is further humidified by water vapor resulting from permeation of heated hot water through the water vapor permeable membrane (38) in the second humidification section (36) on the hydrogen electrode exhaust gas side, whereas the air, humidified by water vapor contained in the oxygen electrode exhaust gas in the first humidification section (33) on the oxygen electrode exhaust gas side, is further humidified by water vapor resulting from permeation of hot heated water through the water vapor permeable membrane (38) in the second humidification section (37) on the oxygen electrode exhaust gas side. Because of such two-stage air humidification, even when the load of the fuel cell (1) changes, it is possible to ensure stable humidification of reformed gas and air to the fuel cell (1) and it is further possible to positively maintain humidifying, almost to water vapor saturation, the reformed gas and air.

Further, in the present embodiment, the first and second humidification sections (32) and (36) on the hydrogen electrode exhaust gas side of the humidification apparatus (31) and the first and second humidification sections (33) and (37) on the oxygen electrode exhaust gas side are formed integrally with the fuel cell (1). This arrangement allows the fuel cell system to have a simplified, compact structure. In addition, since the heated hot water used to derive water vapor in the second humidification sections (36) and (37) is cooling water for the fuel cell (1), this makes it possible to obtain heated hot water by making utilization of such existing cooling water.

Second Embodiment

Figure 5:
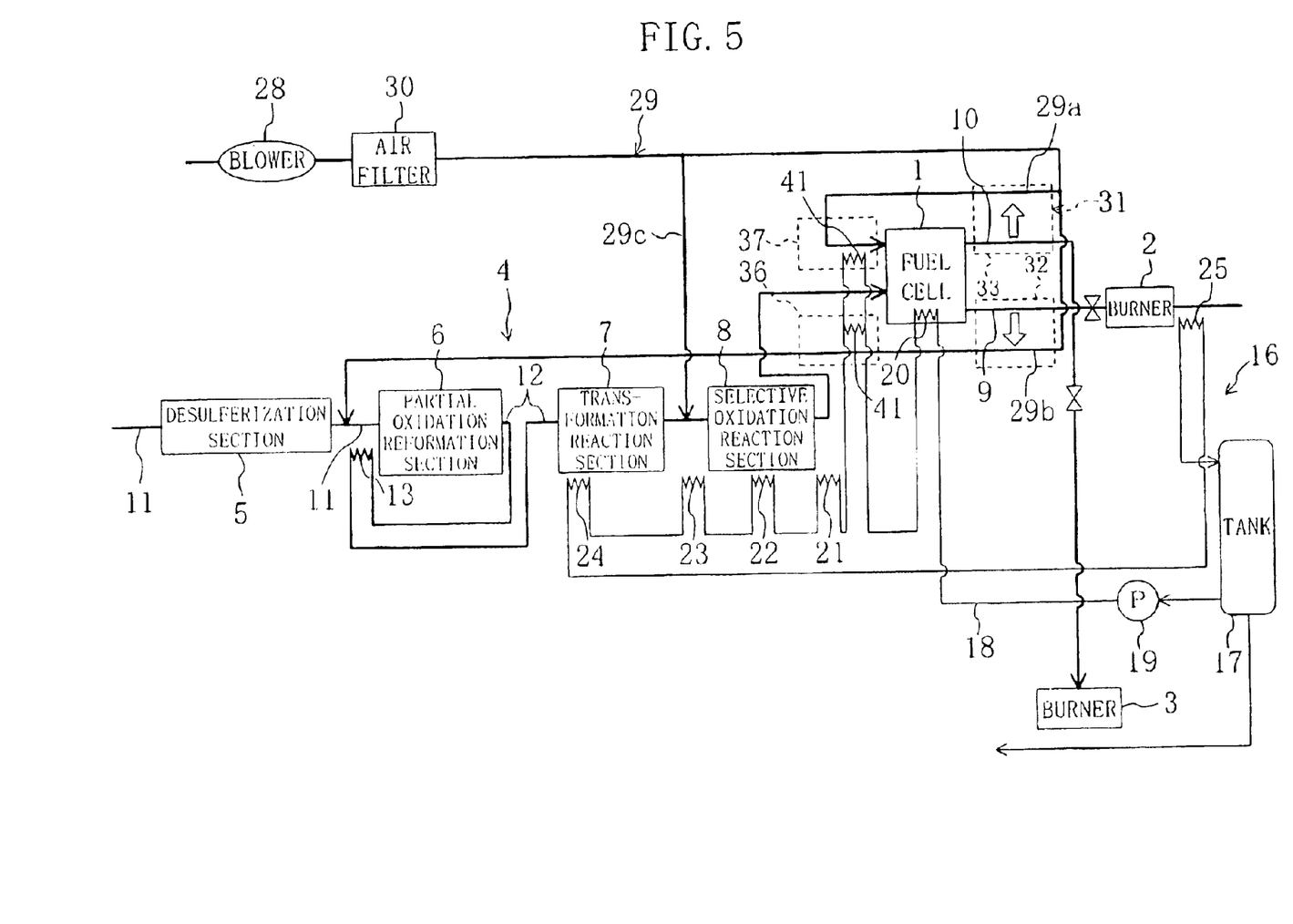
FIG. 5 is a diagram corresponding to FIG. 1, showing a second embodiment of the present invention.

FIG. 5 shows a second embodiment of the present invention. In each of the following embodiments of the present invention, the same elements as shown in FIGS. 1 through 4 have been assigned the same reference numerals and their description will not be made in detail. In the first embodiment, the second humidification sections (36) and (37) are formed integrally with the fuel cell (1). On the other hand, in the second embodiment example they are provided separately from the fuel cell (1).

That is, in the present embodiment, both the second humidification section (36) on the hydrogen electrode exhaust gas side of the humidification apparatus (31) and the second humidification section (37) on the oxygen electrode exhaust gas side are provided separately from the fuel cell (1). Further, the number of fuel cell cooling sections (20) in the cooling water supply device (16) is one. Furthermore, branch connected in parallel to the cooling water passageway (18) between the fuel cell cooling section (20) and the first heat exchange section (21) are a pair of humidification water passageways (41) and (41) facing the second humidification section (36) on the hydrogen electrode exhaust gas side and the second humidification section (37) on the oxygen electrode exhaust gas side, respectively. In each of the second humidification sections (36) and (37), hot water in the humidification water passageway (41) of the cooling water supply device (16) is let to penetrate through the water vapor permeable membrane (38) to generate water vapor, and air humidification is performed using the generated water vapor. Other structures are the same as the first embodiment, and the present embodiment achieves the same action and effect as the first embodiment.

Third Embodiment

Figure 6:
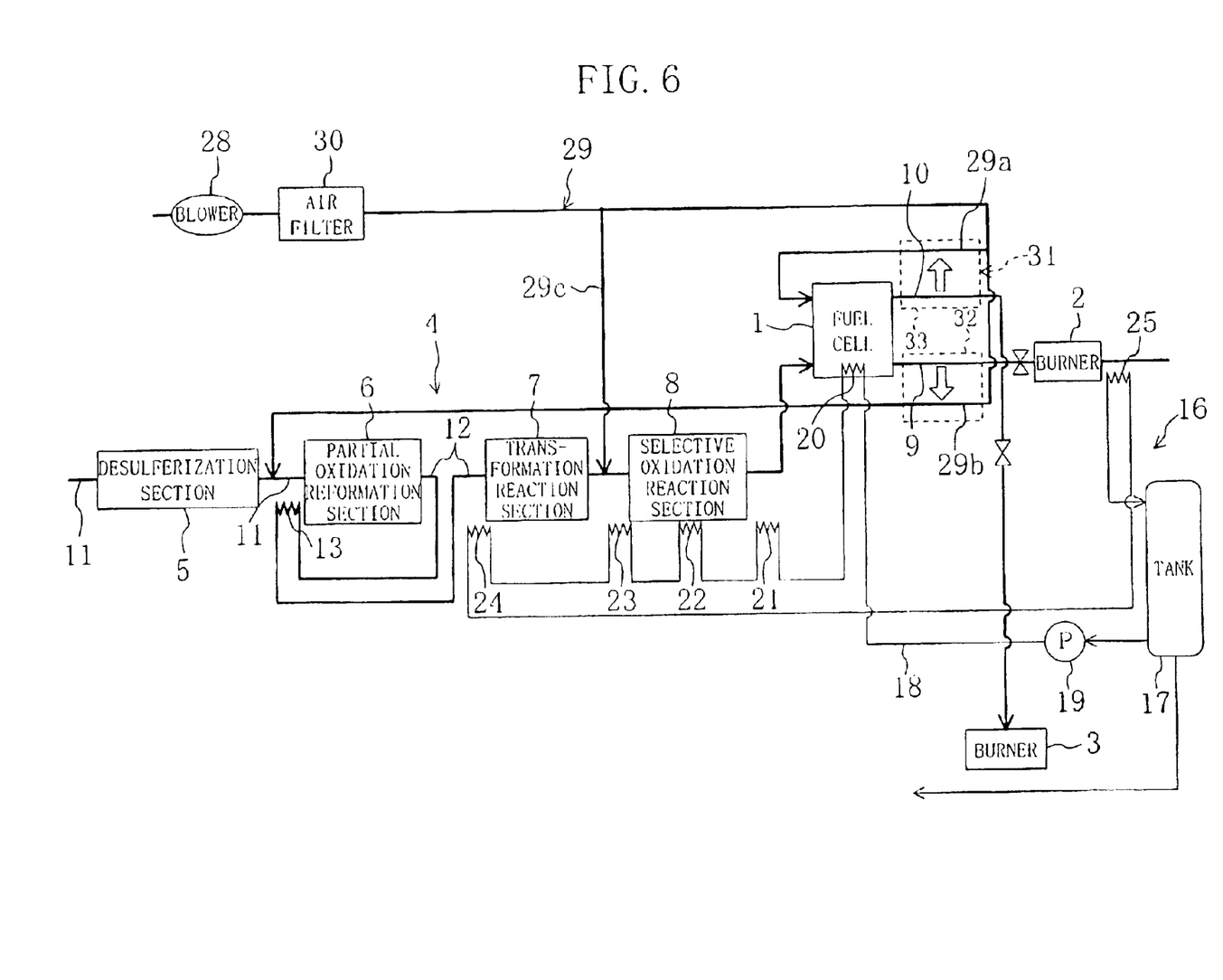
FIG. 6 is a diagram corresponding to FIG. 1, showing a third embodiment of the present invention.

FIG. 6 shows a third embodiment of the present invention similar to the first embodiment. In the third embodiment, neither the second humidification section (36) on the hydrogen electrode exhaust gas side nor the second humidification section (37) on the oxygen electrode exhaust gas side is provided and the humidification apparatus (31) is made up of only the first humidification sections (32) and (33). For the case of the present embodiment, the humidification stability of reformed gas and air when the load of the fuel cell (1) changes somewhat decreases for the degree that the second humidification sections (36) and (37) are omitted, but other than that, the present embodiment achieves the same action and effect as the first embodiment.

Fourth Embodiment

Figure 7:
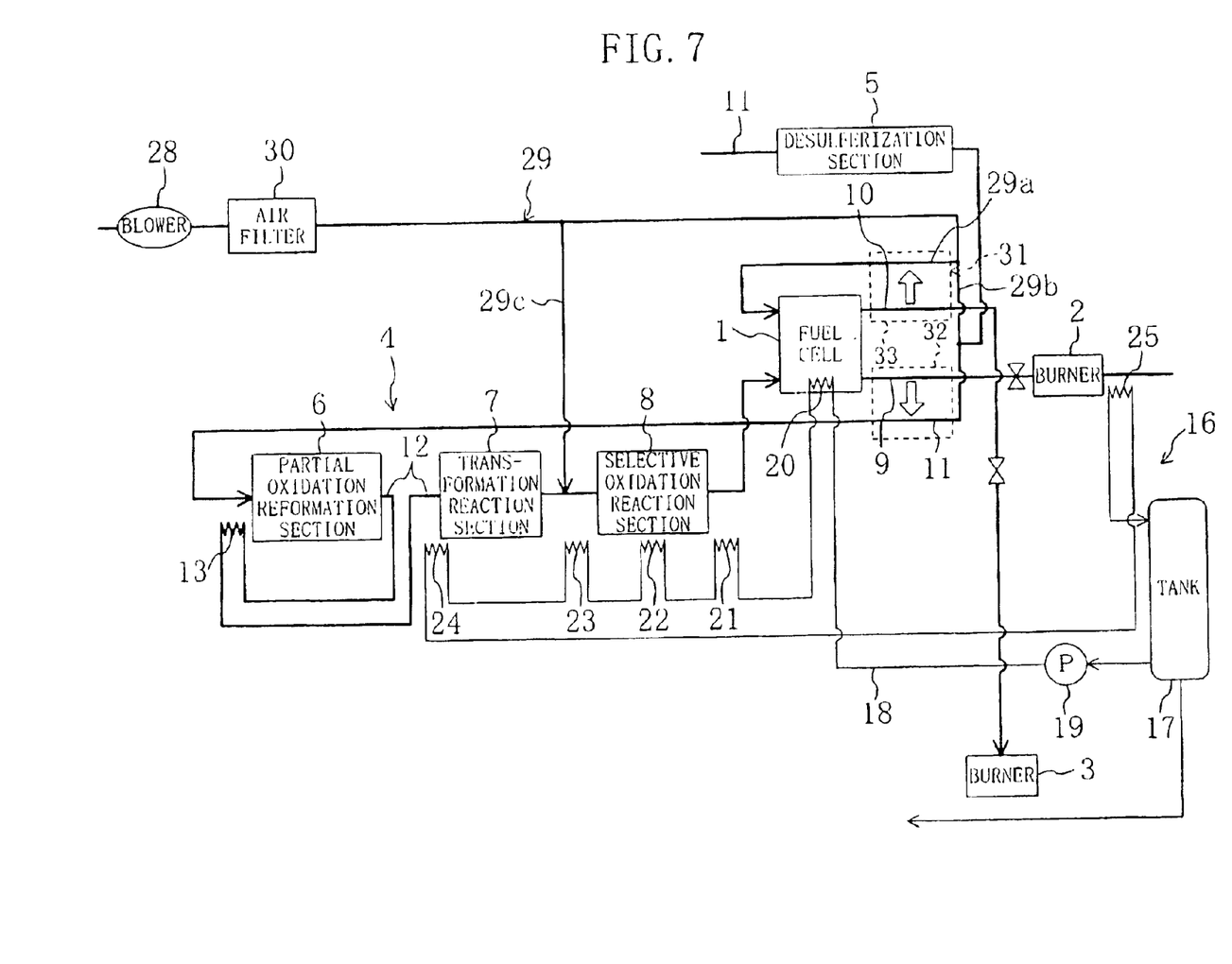
FIG. 7 is a diagram corresponding to FIG. 1, showing a fourth embodiment of the present invention.

FIG. 7 shows a fourth embodiment of the present invention. In each of the above-described embodiments, water vapor in the hydrogen electrode exhaust gas of the fuel cell (1) penetrates through the water vapor permeable membrane (34) in the first humidification section (32) on the hydrogen electrode exhaust gas side, whereby the water vapor is supplied to air that is introduced into the partial oxidation reformation section 6. On the other hand, in the present embodiment, the water vapor is supplied to a mixture of air that is introduced into the partial oxidation reformation section (6) and source gas.

That is, in accordance with the present embodiment, in the structure of the third embodiment (see FIG. 6) the source gas passageway (11) between the downstream end connection portion of the second branch air passageway (29b) of the air supply passageway (29) and the partial oxidation reformation section (6) is disposed so as to pass through the first humidification section (32) on the hydrogen electrode exhaust gas side, and in the first humidification section (32) on the hydrogen electrode exhaust gas side water vapor contained in hydrogen electrode exhaust gas from the hydrogen electrode of the fuel cell (1) penetrates through the water vapor permeable membrane (34) so that the water vapor is supplied to a mixture of air that is introduced into the partial oxidation reformation section (6) and source gas. Accordingly, the present embodiment achieves the same action and effect as the third embodiment example.

Fifth Embodiment

Figure 8:
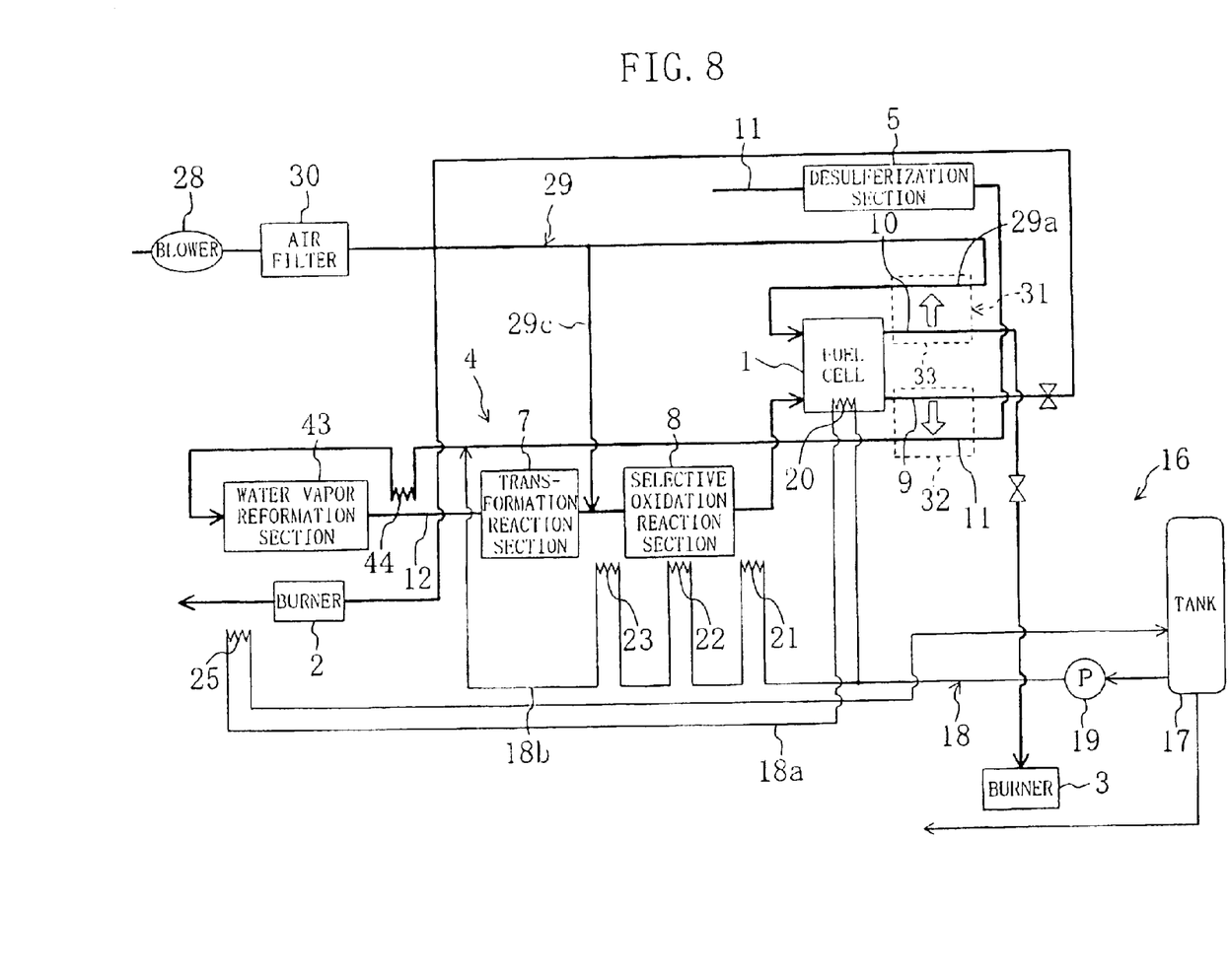
FIG. 8 is a diagram corresponding to FIG. 1, showing a fifth embodiment of the present invention.

FIG. 8 shows a fifth embodiment of the present invention. In each of the foregoing embodiments, the reformation device (4) for reforming a source gas is equipped with the partial oxidation reformation section (6). On the other hand, in the present embodiment, a water vapor reformation section (43) is provided in place of the partial oxidation reformation section (6).

That is, in the present embodiment, the water vapor reformation section (43) is connected in series between the desulfurization section (5) and the transformation reaction section (8). Further, of the branch air passageways of the air supply passageway (29), the second branch air passageway (29b) is not provided. Furthermore, the cooling water passageway (18) on the downstream side of the circulation pump (19) is divided into first and second branch water passageways (18a) and (18b). The fuel cell cooling section (20) and the burner heat recovery section (25) positioned downstream of the fuel cell cooling section (20) are disposed in the first branch water passageway (18a), and the first branch water passageway (18a) is connected, at its downstream end, to the recovery portion of the water tank (17). On the other hand, the first to third heat exchange sections (21), (22) and (23) are disposed in the second branch water passageway (18b), and the second branch water passageway (18b) is connected, at its downstream end, to the source gas passageway (11). Hot water is added, from the second branch water passageway (18b), to the source gas whose sulfur component has been removed in the desulfurization section (5). Then, the source gas is supplied to the water vapor reformation section (43) so that it is reformed into a hydrogen rich reformed gas. The reformed gas is fed to the transformation reaction section (7).

The reference numeral (44) represents a source gas preheating section which is disposed in the source gas passageway (11) between a connection portion of the cooling water passageway (18) to the second branch water passageway (18b) and the water vapor reformation section (43). The source gas preheating section (44) cools reformed gas generated in the water vapor reformation section (43) and recovers exhaust heat. Further, the source gas preheating section (44) preheats, by making utilization of the recovered exhaust heat, source gas in the source gas passageway (11) that is fed to the water vapor reformation section (43).

In the first humidification section (23) on the hydrogen electrode exhaust gas side of the reformation device (4), water vapor in the hydrogen electrode exhaust gas penetrates through the water vapor permeable membrane (34) and then supplied to source gas flowing from the desulfurization section (5) to the water vapor reformation section (43). Other structures are the same as the fourth embodiment (see FIG. 7).

In the present embodiment example, water is added to source gas whose sulfur component has been removed in the desulfurization section (5) from the second branch water passageway (18b) of the cooling water passageway (18), and then the source gas is supplied to the water vapor reformation section (43) at which it is reformed into a hydrogen rich reformed gas. The reformed gas is supplied from the water vapor reformation section (43) to the transformation reaction section (7). And, water vapor in the hydrogen electrode exhaust gas of the fuel cell (1), which has penetrated through the water vapor permeable membrane (34), is supplied to the source gas prior to introduction to the water vapor reformation section (43). Accordingly, the present embodiment also achieves the same action and effect as the fourth embodiment example.

Sixth Embodiment

Figure 9:
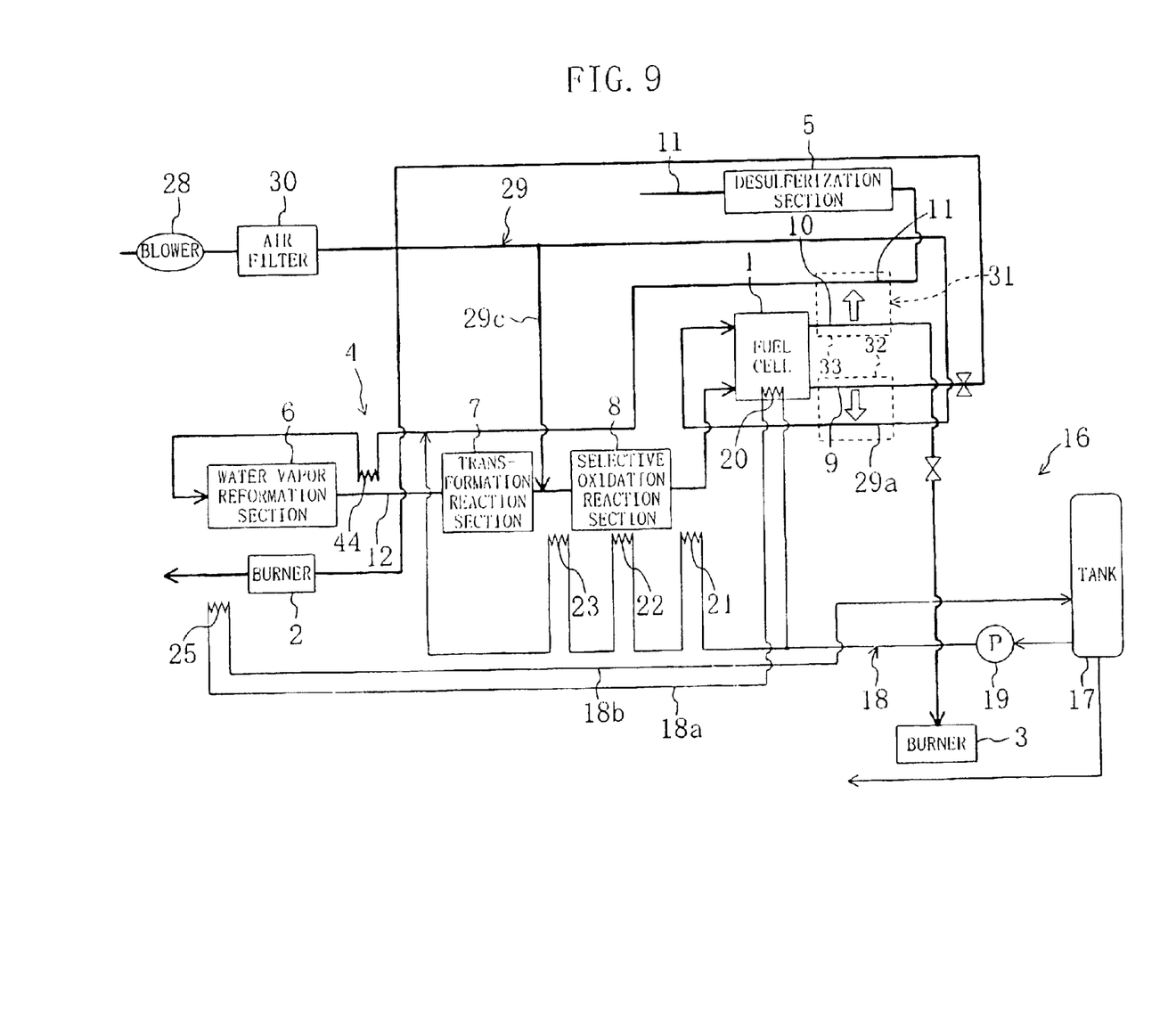
FIG. 9 is a diagram corresponding to FIG. 1, showing a sixth embodiment of the present invention.

FIG. 9 shows a sixth embodiment of the present invention. In the fifth embodiment, water vapor in the hydrogen electrode exhaust gas from the fuel cell (1) is supplied to source gas in the source gas passageway (11) in the first humidification section (32) on the hydrogen electrode exhaust gas side, whereas water vapor in the oxygen electrode exhaust gas from the fuel cell (1) is supplied to air that is fed to the oxygen electrode of the fuel cell (1) in the first humidification section (33) on the oxygen electrode exhaust gas side. On the other hand, in the present embodiment, water vapor in the hydrogen electrode exhaust gas from the fuel cell (1) is supplied to air that is fed to the oxygen electrode of the fuel cell (1) in the first humidification section (32) on the hydrogen electrode exhaust gas side, whereas water vapor in the oxygen electrode exhaust gas from the fuel cell (1) is supplied to source gas in the source gas passageway (11) in the first humidification section (33) on the oxygen electrode exhaust gas side. The present embodiment also achieves the same action and effect as the fifth embodiment.

Seventh Embodiment

Figure 10:
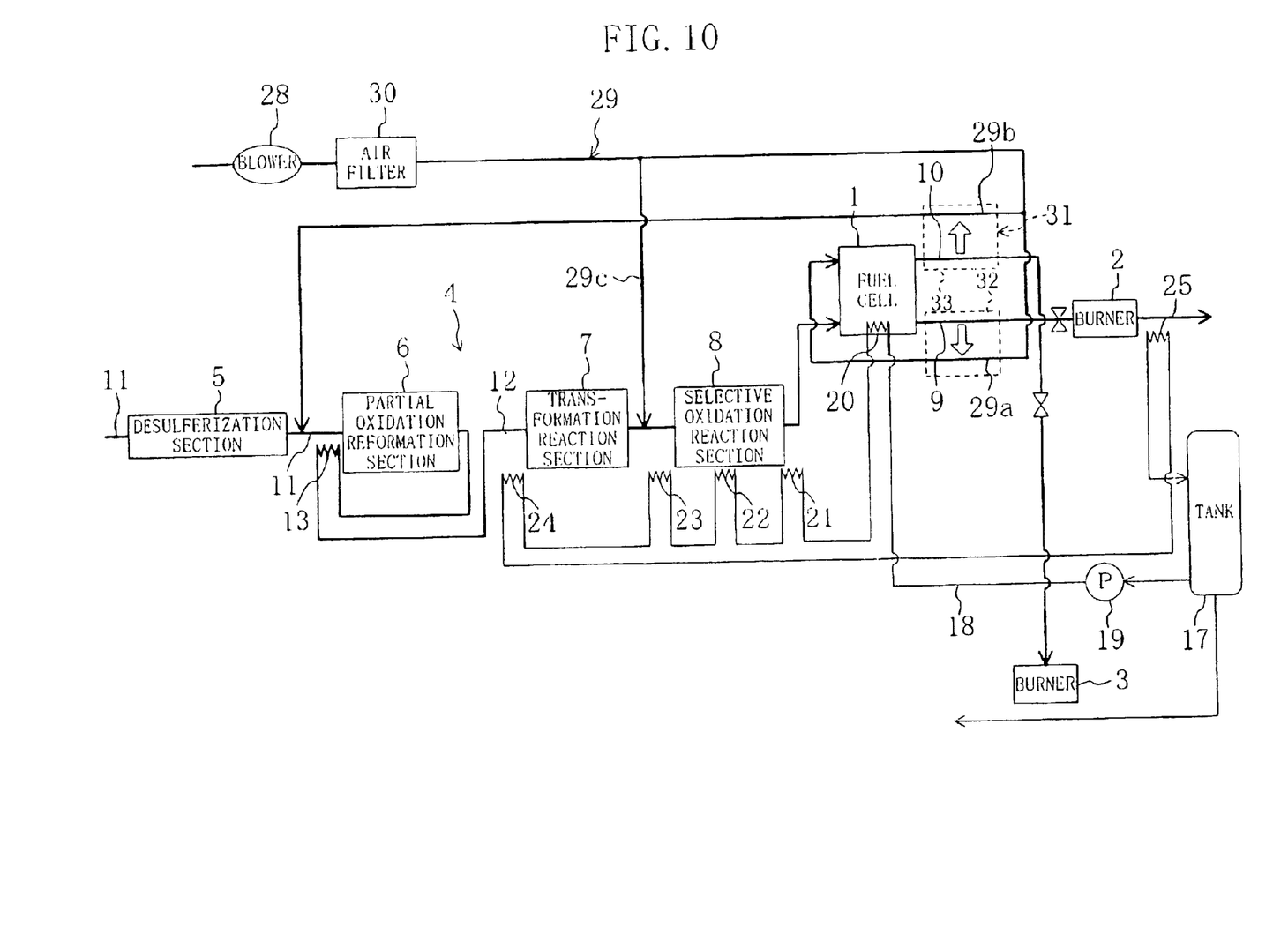
FIG. 10 is a diagram corresponding to FIG. 1, showing a seventh embodiment of the present invention.

FIG. 10 shows a seventh embodiment of the present invention. In the third embodiment (see FIG. 6), water vapor in the hydrogen electrode exhaust gas from the fuel cell (1) is supplied to air that is introduced into the partial oxidation reformation section (6) in the first humidification section (32) on the hydrogen electrode exhaust gas side, whereas water vapor in the oxygen electrode exhaust gas from the fuel cell (1) is supplied to air that is fed to the oxygen electrode of the fuel cell (1) in the first humidification section (33) on the oxygen electrode exhaust gas side. On the other hand, in accordance with the present embodiment, water vapor in the hydrogen electrode exhaust gas from the fuel cell (1) is supplied to air that is fed to the oxygen electrode of the fuel cell (1) in the first humidification section (32) on the hydrogen electrode exhaust gas side, whereas water vapor in the oxygen electrode exhaust gas from the fuel cell (1) is supplied to air that is introduced into the partial oxidation reformation section (6) in the first humidification section (33) on the oxygen electrode exhaust gas side. The present embodiment also achieves the same action and effect as the third embodiment.

In the seventh embodiment, water vapor in the oxygen electrode exhaust gas from the fuel cell (1) may be supplied to a mixture of air that is introduced into the partial oxidation reformation section (6) and source gas in the first humidification section (33) on the oxygen electrode exhaust gas side, as in the fourth embodiment (see FIG. 7). Further, like the first embodiment (see FIG. 1), the second humidification section (36) on the hydrogen electrode exhaust gas side for humidifying air humidified by water vapor in the hydrogen electrode exhaust gas with water vapor resulting from permeation of heated hot water through the water vapor permeable membrane (38), may be provided.

INDUSTRIAL APPLICABILITY

The present invention eliminates the need for providing heating for obtaining water vapor when humidifying, almost to water vapor saturation, reformed gas that is supplied to the hydrogen electrode of a solid polymer type fuel cell and air that is supplied to the oxygen electrode This provides improvements in fuel cell system thermal efficiency as well as in practicability. Therefore, the present invention provides excellent industrial applicability.

What is claimed is:

1. A fuel cell humidification apparatus for a fuel cell (1), said fuel cell (1) having oxygen and hydrogen electrodes between which is interposed a solid polymer electrolyte for producing an electromotive force between said electrodes by supplying hydrogen containing reformed gas reformed in reformation means (4) and oxygen containing gas to said hydrogen electrode and to said oxygen electrode, respectively, said fuel cell humidification apparatus comprising humidification means (31) wherein water vapor contained in exhaust gas expelled from said fuel cell (1) penetrates through a water vapor permeable membrane (34) and then supplied, at least, to supply gas to said reformation means (4).

2. The fuel cell humidification apparatus of claim 1, wherein said reformation means (4) includes a partial oxidation reformation section (6) which generates, from source gas, hydrogen rich reformed gas through reactions including partial oxidation.

3. The fuel cell humidification apparatus of claim 2, wherein said humidification means (31) is arranged so that water vapor contained in hydrogen electrode exhaust gas expelled from said hydrogen electrode of said fuel cell (1) penetrates through said water vapor permeable membrane (34) and then supplied either to air or to a mixture of air and source gas that is introduced into said partial oxidation reformation section (6).

4. The fuel cell humidification apparatus of claim 1, wherein said reformation means (4) includes a water vapor reformation section (43) which generates, from source gas, hydrogen rich reformed gas through reactions.

5. The fuel cell humidification apparatus of claim 4, wherein said humidification means (31) is arranged so that water vapor contained in hydrogen electrode exhaust gas expelled from said hydrogen electrode of said fuel cell (1) penetrates through said water vapor permeable membrane (34) and then supplied to source gas that is introduced into said water vapor reformation section (43).

6. The fuel cell humidification apparatus of claim 3, wherein said humidification means (31) includes a first humidification section (32) which humidifies air or gas with water vapor in hydrogen electrode exhaust gas and a second humidification section (36) which humidifies said air or gas humidified in said first humidification section (32) with water vapor resulting from permeation of heated hot water through a water vapor permeable membrane (38).

7. The fuel cell humidification apparatus of claim 2, wherein said humidification means (31) is arranged so that water vapor contained in oxygen electrode exhaust gas expelled from said oxygen electrode of said fuel cell (1) penetrates through said water vapor permeable membrane (34) and then supplied to oxygen containing gas to said fuel cell (1).

8. The fuel cell humidification apparatus of claim 7, wherein said humidification means (31) includes a first humidification section (33) which humidifies gas with water vapor in oxygen electrode exhaust gas and a second humidification section (37) which humidifies said gas humidified in said first humidification section (33) with water vapor resulting from permeation of heated hot water through said water vapor permeable membrane (38).

9. The fuel cell humidification apparatus of claim 2, wherein said humidification means (31) is arranged so that water vapor contained in oxygen electrode exhaust gas expelled from said oxygen electrode of said fuel cell (1) penetrates through said water vapor permeable membrane (34) and then supplied either to air or to a mixture of air and source gas that is introduced into said partial oxidation reformation section (6).

10. The fuel cell humidification apparatus of claim 4, wherein said humidification means (31) is arranged so that water vapor contained in oxygen electrode exhaust gas expelled from said oxygen electrode of said fuel cell (1) penetrates through said water vapor permeable membrane (34) and then supplied to source gas that is introduced into said water vapor reformation section (43).

11. The cell humidification apparatus of claim 9 wherein said humidification means (31) includes a first humidification section (33) which humidifies air or gas with water vapor in oxygen electrode exhaust gas and a second humidification section (37) which humidifies said air or gas humidified in said first humidification section (33) with water vapor resulting from permeation of heated hot water through said water vapor permeable membrane (38).

12. The fuel cell humidification apparatus of claim 9, wherein said humidification means (31) is arranged so that water vapor contained in hydrogen electrode exhaust gas expelled from said hydrogen electrode of said fuel cell (1) penetrates through said water vapor permeable membrane (34) and then supplied to oxygen containing gas to said fuel cell (1).

13. The fuel cell humidification apparatus of claim 12, wherein said humidification means (31) includes a first humidification section (32) which humidifies gas with water vapor in hydrogen electrode exhaust gas and a second humidification section (36) which humidifies said gas humidified in said first humidification section (32) with water vapor resulting from permeation of heated hot water through said water vapor permeable membrane (38).

14. The fuel cell humidification apparatus of claim 3, 5, 7, 9, 10 or 12, wherein said humidification means (31) is formed integrally with said fuel cell (1).

15. The fuel cell humidification apparatus of claim 6, 8, 11, or 13,
wherein said first and second humidification sections (32), (33), (36) and (37) of said humidification means (31) are formed integrally with said fuel cell (1); and
wherein said heated hot water is cooling water for said fuel cell (1).

16. The fuel cell humidification apparatus of 6, 8, 11, or 13,
wherein said first and second humidification sections (32), (33), (36) and (37) of said humidification means (31) are provided separately from said fuel cell (1); and
wherein said heated hot water is hot water for hot water supply means (16).

17. The fuel cell humidification apparatus of claim 1, wherein said water vapor permeable membrane (34), through which water vapor contained in exhaust gas penetrates, is a hydrophilic membrane.

18. The fuel cell humidification apparatus of claim 1, wherein said water vapor permeable membrane (34), through which water vapor contained in exhaust gas penetrates, is a polymer membrane having a sulfonic acid group.

19. The fuel cell humidification apparatus of claims 6, 8, 11 or 13, wherein said water vapor permeable membrane (38) of each of said second humidification sections (36) and (37) is a hydrophobic membrane.

20. The fuel cell humidification apparatus of claim 6, 8, 11 or 13, wherein said water vapor permeable membrane (38) of each of said humidification sections (36) and (37) is a porous membrane formed from a porous membrane of the polytetrafluoropolyethylene family, the polypropylene family, or the polyethylene family.

* * * * *

UNITED STATES PATENT AND TRADEMARK OFFICE
CERTIFICATE OF CORRECTION

PATENT NO.   : 6,787,256 B2
DATED        : September 7, 2004
INVENTOR(S)  : Nobuki Matsui, Shuji Ikegami, Yasunori Okamoto and Kazuo Yonemoto It is certified that error appears in the above-identified patent and that said Letters Patent is hereby corrected as shown below:

<u>Title page,</u>
Item [56], References Cited, FOREIGN PATENT DOCUMENTS, delete "JP 10-33010" and insert -- JP 10-330101 --

Signed and Sealed this

Twenty-eighth Day of December, 2004

JON W. DUDAS
*Director of the United States Patent and Trademark Office*